April 5, 1966  D. R. PARRISH  3,244,228
FLOODING PROCESS FOR RECOVERY OF OIL
Filed Dec. 27, 1962
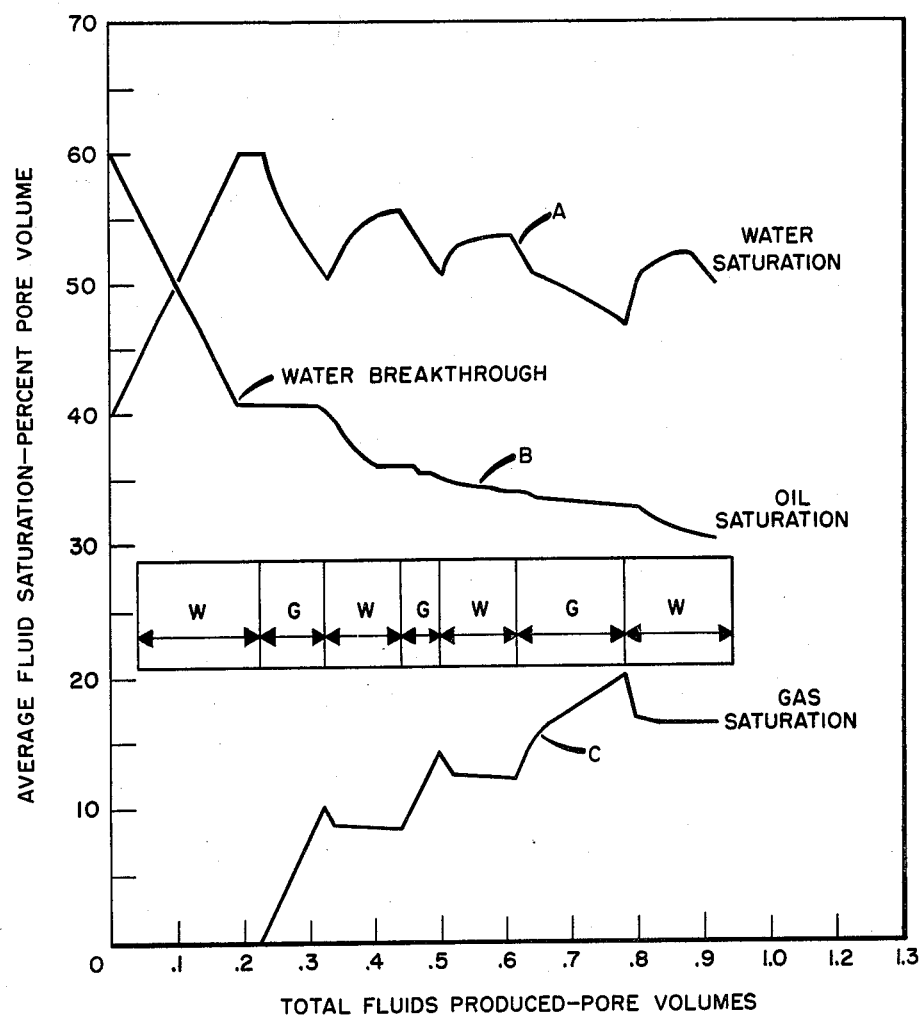
DAVID R. PARRISH, INVENTOR.

United States Patent Office 3,244,228
Patented Apr. 5, 1966

3,244,228
FLOODING PROCESS FOR RECOVERY OF OIL
David R. Parrish, Tulsa, Okla., assignor to Pan American Petroleum Corporation, Tulsa, Okla., a corporation of Delaware
Filed Dec. 27, 1962, Ser. No. 247,604
11 Claims. (Cl. 166—9)

The present invention relates to an improvement in recovering petroleum from a waterflooded oil-containing formation. More particularly, it is concerned with a procedure by which increased oil recoveries are experienced using a gas and a liquid as the driving fluid.

Briefly, the process of my invention involves the injection of a gas into a watered-out reservoir or into the waterflooded portion of an existing waterflood, the gas being generally first introduced into the formation until gas breakthrough into the producing well or wells is observed. Thereafter, water is injected again, usually until breakthrough into a producing well, after which the cycle may be repeated for one or more times until further operations are no longer economically justified.

It is known that gas saturation established in an oil-bearing formation prior to waterflooding operations benefits oil recovery. This sometimes is referred to as the "trapped gas" phenomenon. According to current thinking, slugs of trapped gas occupy spaces that otherwise ultimately would have contained trapped oil, and thus the amount of trapped or residual oil is reduced. Any benefits from gas injection with respect to immiscible displacement efficiency, however, in the past have been considered dependent upon injection of the gas prior to waterflooding before the oil is trapped. The use of the term "trapped oil" implies that such oil cannot be displaced by an immiscible phase or phases. I have found, however, that this is not the case and that at least some of the so-called trapped oil can be recovered by the alternate injection of air and water into the formation. This affords an opportunity to recover additional oil even from fields that have been waterflooded and heretofore considered depleted.

In the past, gas and water have been injected into a waterflooded oil reservoir for the purpose of recovering additional oil. However, the means in which these fluids were injected did not permit conditions suitable for appreciable oil recovery. Thus, while it was taught that a gas, such as air, and water could be introduced alternately into the reservoir, the frequency of the individual gas and water injection cycle was so rapid that very little, if any, gas remained trapped in the pores of the reservoir rock. In fact, it was desired that these cycles be so rapid that a mixture or mass of gas bubbles and water permeate the formation. With a condition of this sort existing in the reservoir, each bubble moving through the rock and coming into contact with the residual oil, i.e., the trapped oil, was thought to draw such oil to the water-gas bubble interface, thereby covering the bubbles with a film of oil. In this way, the air bubbles were looked upon as carriers of the oil, picking it up and moving it on through the reservoir. The injection conditions employed were such that these bubbles were forced through the reservoir by means of a current of water that flowed continuously. Though water and gas were alternately injected into the oil-bearing stratum, this operation was effected in a manner so as to mix the two phases with one another practically as soon as they entered the formation. The bulk of the reservoir was subjected to the simultaneous flow of gas and water. Little or no trapped or immobile gas remained in any significant portion of the reservoir. In other words, the first few feet of rock around the well bore served as a mixing zone. Accordingly, as such a procedure was carried out, the gas and water were incapable of any independent action with the reservoir.

It is therefore an object of my invention to provide a method whereby gas can be forced into a reservoir in such a way as to bring out residual oil into the flow channels of the reservoir by means of trapped or residual gas which replaces such residual oil after the formation has been waterflooded. It is another object of my invention to provide a means for recovering oil left in a waterflooded reservoir, by the alternate injection of gas and a liquid under conditions such that principal oil production is secured on injection of said liquid and relatively little or no oil is produced on the gas injection cycle. It is still another object to effect the herein described process in which the reservoir involved exhibits a wetting preference to either oil or water. It is a further object to provide a means whereby maximum oil recovery can be obtained in a gas-water drive or flood with the use of minimum volumes of the latter fluids.

In carrying out a preferred embodiment of my invention, I start with a waterflooded reservoir or the waterflooded portion of an existing waterflooding operation. In either case water injection is discontinued and a gas (oil-immiscible) such as—for example—air, flue gas or gaseous products of combustion, is introduced into the oil-bearing formation. The duration of this step may vary. However, it should continue until a gas saturation of about 5 percent pore volume is established in all or a substantial part of the pattern. In other words, injection is continued until gas is the predominant fluid flowing through the reservoir. The same holds true in the case of the water injection step. This condition can be readily calculated by those skilled in the art through the use of well-known methods, for example, such as discussed in Pirson's Elements of Reservoir Engineering, McGraw-Hill Book Co., 1950. Generally, it is preferable, at least for the first gas injection step, to inject gas until the breakthrough at the producing well or wells. This generally requires from about 10 to 12 percent pore volume of gas. The gas injection step may range over a period of from several days to several months or a year, depending, of course, on the distance between wells—which is ordinarily at least 300 feet—the thickness of the oil-bearing formation involved and whether or not 5 percent gas saturation or gas breakthrough is the desired limit. Ordinarily, the size of the gas slugs used in carrying out the present invention need not be larger than from about 5 to about 7 percent of the pore volume after the initial gas injection step. In this connection, I have found that from about 50 to 90 percent of the gas spaces developed during the gas injection or drive are retained as a trapped gas phase, both during and after the subsequent water drive.

Following the initial gas drive, water is injected and this portion of the process likewise may last for a length of time similar to that normally required for the gas drive. The quantity of water used may vary. However, little—if any—additional benefit is obtained by the use of amounts in excess of about 10 percent pore volume. After this quantity of water has been injected, the gas and water injection cycles are repeated until the water-oil ratio becomes uneconomical. Over-all, the total gas and water injected—for example in three cycles before the process is discontinued—may amount to 35 percent pore volume of gas and about 40 percent pore volume of water.

I have found that the amount of additional oil recovery obtainable is about one-half of the gas saturation developed during the gas injection step. The extra oil production is the result of the injected gas occupying part of the volume normally associated with the trapped residual oil saturation and, in the case of both water-wet as well as oil-wet reservoirs, is obtained during the water injection cycle.

Under oil-wet conditions the alternate injection of gas and water produces additional oil by decreasing the permeability to water without significantly lowering the oil permeability. The amount of additional oil recovery depends upon the ratio of the permeability to water to the permeability to oil that has been produced during the initial water drive. For example, oil-wet reservoirs containing high viscosity oils may produce large amounts of additional oil, but flooded-out reservoirs containing low viscosity, i.e., less than 5 cp., oils may produce little or no additional oil.

To further illustrate my invention, reference is made to the drawing showing a series of plots of oil, gas and water saturation in a flooded-out, water-jet Torpedo sandstone core. Curves A, B and C indicate water, oil and gas saturation, respectively. The block scale between Curves B and C, sections of which are alternately labeled "W" and "G," indicates the extent (in terms of pore volumes) of each water and gas injection interval. It will be noted, as gas was introduced from about .2 to about .3 pore volume, the oil saturation remains substantially constant while the water saturation decreased from 60 to 50 percent pore volume. Gas injection was then discontinued and saturation with respect to that fluid remained constant from about .3 to about .45 pore volume. Water injection during this interval, however, was resumed with the result that oil saturation of this same interval, i.e., .3 to .45 pore volume, decreased, indicating oil production. Because the system was under elevated pressure to reduce the compressibility of the gas, the quantity of injected fluids is essentially equivalent to the volume of produced fluids. Therefore, the abscissa of the drawing might also be interpreted as an indication of total fluids injected. In preparing the cores used in this work, they were first filled with water and flooded with oil to simulate a virgin reservoir. Next the cores were waterflooded to obtain a residual oil saturation of about 40 percent pore volume. Gas (air) thereafter was injected until breakthrough. No oil was produced during this gas drive, but on injection of water, oil production started. After 10 percent pore volume of water had been injected, the oil flow essentially stopped. The gas and water cycle was repeated a second and third time with the production of oil being resumed soon after the start of water injection in each case. The amount of water needed to produce the additional oil was about the same for each gas-water cycle. In all of the runs made, regardless of the core length or the state of depletion, all of the extra oil was produced for each cycle by the time about 10 percent pore volume of water had been introduced. Similar tests made in a flooded-out Berea sandstone core having neutral wettability gave negative results. Accordingly, based on this observation and the results produced with oil-wet and water-wet cores, the process of my invention should be carried out in reservoirs preferably having pronounced oil- or water-wet characteristics. Therefore, it is to be strictly understood that in the present description and claims the interpretation or construction of the term "reservoir" is to be so limited.

A comparison of simultaneous gas and water injection with alternate gas and water injection in water-wet and oil-wet reservoirs is shown in the tables below. In this work, water-wet Torpedo sandstone cores (initially waterflooded) 1⅞-inch in diameter, ranging in length from 3.03 feet to 9.61 feet, were used. Some of the cores used were mounted in Hassler type holders. Close-fitting neoprene rubber tubes were stretched over each core to provide a seal. The tubing extended over end pieces which permitted external connection. The neoprene and cased cores were placed inside of 2″ I.D. steel pressure tubes. The annular space between the steel and neoprene tubes was pressured to a level in excess of the run pressure, thereby providing a seal. The liquids were saturated with the driving gas (nitrogen) at the run pressure. For the water-wet runs .25 normal sodium chloride brine and a mixture of $C_{10}$ to $C_{12}$ hydrocarbons and mineral oil were used as the liquids. The oil-wet runs were made in the water-wet Torpedo cores by interchanging the roles of the oil and water. Appropriate adjustments in the viscosity ratios were made by adding glycerine to the water. For the high-viscosity ratio runs, a pure glycerine was used as the "oil" and a $C_{10}$ to $C_{12}$ hydrocarbon fraction was used as the "water."

In each case where gas and water were alternately injected, gas was initially injected to breakthrough. This usually corresponded to about 10 to 12 percent of the pore volume. The water slugs amounted to about 10 percent and the subsequent gas slugs amounted to from 5 to 7 percent of the pore volume.

Table I.—Alternate gas-water injection

| Drive No. | Core Length, feet | Permeability, md. | Pore Volume, cc. | Viscosity Ratio Oil/Water | Achieved Gas Saturation, Percent Pore Volume | Residual Oil Saturation, Percent Pore Volume | Cumulative Improvement At End of Drive, Change in Residual Oil Saturation, Percent Pore Volume | Pore Volumes Cumulative Gas Injected | Total Fluids Injected After First Flood |
|---|---|---|---|---|---|---|---|---|---|
| 0 | 9.61 | 365 | 1,070 | 8.3 | 0 | 39.8 | 0 | 0 | 0 |
| 1 | | | | | 10.7 | 34.8 | 5.0 | .108 | .159 |
| 2 | | | | | 15.5 | 32.2 | 7.6 | .158 | .448 |
| 3 | | | | | 19.8 | 30.1 | 9.7 | .211 | .646 |
| 4 | | | | | 22 | 28.5 | 11.3 | .426 | 1.006 |

Table II.—Simultaneous Gas/Water Injection

| Step No. | Core Length, feet | Permeability, md. | Pore Volume, cc. | Viscosity Ratio Oil/Water | Gas/Water Ratio | Achieved Gas Saturation, Percent Pore Volume | Residual Oil Saturation, Percent Pore Volume | Cumulative Improvement At End of Drive, Change in Residual Oil Saturation, Percent Pore Volume | Pore Volumes, Cumulative Fluids Injected After Original Flood | Pore Volumes Cumulative Gas Injected |
|---|---|---|---|---|---|---|---|---|---|---|
| 0 | 3.03 | 5.40 | 377.5 | 1.5 | 0 | 0 | 41.5 | 0 | 0 | 0 |
| 1 | | | | | 6:1 | 8.5 | 41.5 | 0 | 5 | .4 |
| 2 | | | | | 6:1 | 16.5 | 35.8 | 5.7 | 3.05 | 2.61 |
| 3 | | | | | 9:1 | 17.8 | 35.5 | 6.0 | 4.35 | 3.42 |
| 4 | | | | | 2:1 | 15.0 | 35.2 | 6.3 | 5.35 | 3.75 |
| 5 | | | | | 0 | 11.0 | 35.0 | 6.5 | 6.0 | 3.75 |

*Table III.—Alternate Gas/Water Injection Oil-Wet Core*

| Drive Run | Core Length, feet | Permeability, md. | Pore Volume, cc. | Viscosity Ratio Oil/Water | Residual Gas Saturation, Percent Pore Volume | Residual Oil Saturation, Percent Pore Volume | Cumulative Improvement At End of Drive, Change in Residual Oil Saturation, Percent Pore Volume | Pore Volumes Cumulative Gas Injected | Total Fluids Injected After First Flood |
|---|---|---|---|---|---|---|---|---|---|
| 0 | 9.61 | 3.65 | 1,070 | 1:5 | 0 | 50.8 | 0 | 0 | 0 |
| 1 | | | | | 10.2 | 47.2 | 3.6 | .099 | .353 |
| 2 | | | | | 14.1 | 44.5 | 6.3 | .141 | .596 |
| 3 | | | | | 21.0 | 39.8 | 11.0 | .214 | 1.02 |

In comparing the results in Tables I and II, it will be seen that where gas and water were alternately injected, the cumulative injected gas amounted to .426 pore volume for an oil recovery of 11.3 percent pore volume (Table I). On the other hand, with simultaneous gas and water injection, or with rapid cycling, the same amount of injected gas produced no oil and after 3.75 pore volumes of injected gas, only 6.0 percent pore volume of oil was recovered. In other words, in the latter case, about nine times more gas produced about 50 percent less oil than was obtained in practicing the process of the present invention.

In the oil-wet work (Table III) the efficiency of the present invention was even higher than shown in Table I. Thus, with only .214 pore volume of injected gas, the oil recovery was 11 percent pore volume, or approximately the same recovery for half the quantity of gas injected in the water-wet runs reported in Table I.

I claim:

1. In a method for recovering petroleum from a previously waterflooded reservoir having an injection well and a producing well extending into said reservoir, the improvement which comprises
   injecting a substantially water and oil-immiscible gas into said reservoir via said injection well until a gas saturation is established of about 5 percent of the pore volume greater than the gas saturation prior to injection of said gas into that portion of said reservoir between said wells,
   thereafter injecting water into said formation via said injection well until a water saturation is established of from about 5 to about 10 percent of the pore volume greater than the water saturation prior to injection of water into that portion of said reservoir between said wells, whereby petroluem flows into said producing well, the gas saturation of said portion of said reservoir remaining substantially constant during the aforesaid water injection step,
   recovering petroleum from said producing well, and repeating the above cycle.

2. In a method for recovering petroleum from a previously waterflooded reservoir having an injection well and a producing well extending into said reservoir, the improvement which comprises
   injecting a substantially water and oil-immiscible gas into said reservoir via said injection well until a gas saturation is established of about 5 percent of the pore volume greater than the gas saturation prior to injection of said gas into that portion of said reservoir between said wells,
   thereafter injecting water into said formation via said injection well until petroleum flows into said producing well and continuing this water injection step until an amount has been injected corresponding to not more than about 10 percent of the pore volume greater than the water saturation prior to injection of water into that portion of said reservoir between said wells, the gas saturation of said portion of said reservoir remaining substantially constant during the aforesaid water injection step,
   recovering petroleum from said producing well, and repeating the above cycle.

3. The process of claim 2 in which flue gas is employed as the injected gas.

4. The process of claim 2 in which gaseous combustion products are employed as the injected gas.

5. The process of claim 2 in which air is employed as the injected gas.

6. The process of claim 5 in which the quantity of air initially injected corresponds to from about 10 to 12 percent of the hydrocarbon pore volume while the quantity of air injected in subsequent steps corresponds to from about 5 to about 7 percent of the hydrocarbon pore volume.

7. In a method for recovering petroleum from a previously waterflooded reservoir having an injection well and a producing well extending into said reservoir, the improvement which comprises
   injecting a water and oil-immiscible gas into said reservoir via said injection well until a gas saturation is established of about 5 percent of the pore volume greater than the gas saturation prior to injection of said gas into that portion of said reservoir between said wells,
   thereafter injecting water into said formation via said injection well until a water saturation is established of from about 5 to about 10 percent of the pore volume greater than the water saturation prior to injection of water into that portion of said reservoir between said wells, the gas saturation of said portion of said reservoir remaining substantially constant during the aforesaid water injection step,
   recovering petroleum from said producing well.

8. In a method for recovering pertoleum from a previously waterflooded reservoir having an injection well and a producing well extending into said reservoir, the improvement which comprises
   injecting a water and oil-immiscible gas into said reservoir via said injection well until a gas saturation is established of about 5 percent of the pore volume greater than the gas saturation prior to injection of said gas into that portion of said reservoir between said wells,
   thereafter injecting water into said formation via said injection well until petroleum flows into said producing well and continuing this water injection step until petroleum production into said producing well ceases, the gas saturation of said portion of said reservoir remaining substantially constant during the aforesaid water injection step,
   recovering petroleum from said producing well, and repeating the above cycle.

9. In a method for recovering petroleum from a previously waterflooded reservoir having an injection well and a producing well extending into said reservoir, the improvement which comprises
   injecting a water and oil-immiscible gas into said reservoir via said injection well until said gas breaks through into said producing well,
   thereafter injecting water into said reservoir via said injection well until petroleum flows into said producing well and continuing this water injection step until an amount has been injected corresponding to not more than about 10 percent of the pore volume greater than the water saturation prior to injection of water into that portion of said reservoir between said wells, the gas saturation of said portion of said reservoir remaining substantially constant during the aforesaid water injection step, recovering petroleum from said producing well, and repeating the above cycle.

10. In a method for recovering petroleum from a previously waterflooded reservoir having an injection well and a producing well extending into said reservoir, the improvement which comprises injecting a water and oil-immiscible gas into said reservoir via said injection well until said gas breaks through into said producing well, thereafter injecting water into said reservoir via said injection well until petroleum flows into said producing well and continuing this water injection step until an amount has been injected corresponding to not more than about 10 percent of the pore volume greater than the water saturation prior to injection of water into that portion of said reservoir between said wells, the gas saturation of said portion of said reservoir remaining substantially constant during the aforesaid water injection step, and recovering petroleum from said producing well.

11. In a method for recovering petroleum from a previously waterflooded reservoir having an injection well and a producing well extending into said reservoir, the improvement which comprises injecting a substantially water and oil-immiscible gas into said reservoir via said injection well until a gas saturation is established of about 5 percent of the pore volume greater than the gas saturation prior to injection of said gas into that portion of said reservoir between said wells, thereafter injecting water into said formation via said injection well until petroleum flows into said producing well and continuing this water injection step until an amount has been injected corresponding to not more than about 10 percent of the pore volume greater than the water saturation prior to injection of water into that portion of said reservoir between said wells, whereby petroleum production into said producing well occurs to any appreciable extent only during said water injection step, the gas saturation of said portion of said reservoir remaining substantially constant during the aforesaid water injection step. and recovering petroleum from said producing well.

References Cited by the Examiner

UNITED STATES PATENTS

| | | | |
|---|---|---|---|
| 2,609,051 | 9/1952 | Brownscombe | 166—7 |
| 2,623,593 | 12/1952 | Whorton | 166—7 |
| 2,927,637 | 3/1960 | Draper | 166—9 |
| 3,036,631 | 5/1962 | Holbrook | 166—9 |
| 3,047,063 | 7/1962 | Connally | 166—10 |

CHARLES E. O'CONNELL, *Primary Examiner.*